United States Patent
Fokkelman

(10) Patent No.: US 9,652,908 B2
(45) Date of Patent: May 16, 2017

(54) SYSTEM ALLOWING A SERVICE PROVIDER TO SELECTIVELY OPEN A VEHICLE

(71) Applicant: CONTINENTAL AUTOMOTIVE GMBH, Hannover (DE)

(72) Inventor: Joris Fokkelman, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 41 days.

(21) Appl. No.: 14/652,035

(22) PCT Filed: Nov. 14, 2013

(86) PCT No.: PCT/EP2013/073835
§ 371 (c)(1),
(2) Date: Jun. 12, 2015

(87) PCT Pub. No.: WO2014/090502
PCT Pub. Date: Jun. 19, 2014

(65) Prior Publication Data
US 2015/0310679 A1   Oct. 29, 2015

(30) Foreign Application Priority Data

Dec. 14, 2012   (DE) .................. 10 2012 223 304

(51) Int. Cl.
*B60R 25/24*    (2013.01)
*G07C 9/00*     (2006.01)
(Continued)

(52) U.S. Cl.
CPC .......... *G07C 9/00007* (2013.01); *B60R 25/24* (2013.01); *G07C 9/00309* (2013.01);
(Continued)

(58) Field of Classification Search
CPC ...... B60R 25/24; B60R 25/241; B60R 25/243
(Continued)

(56) References Cited

U.S. PATENT DOCUMENTS

2003/0102958 A1 * 6/2003 Gudmundsson ........ B60R 25/04
340/5.7
2006/0143463 A1   6/2006 Ikeda et al.
(Continued)

FOREIGN PATENT DOCUMENTS

DE   102006042358 A1   3/2008
DE   102011011697 A1   12/2011
(Continued)

*Primary Examiner* — Kevin Kim
(74) *Attorney, Agent, or Firm* — Cozen O'Connor

(57) ABSTRACT

A system for selectively opening a vehicle includes a first communication module for establishing a communication link to a service provider who obtains authorization data via a communication network, a first identification routine for unambiguously identifying the service provider, and a second communication module for establishing, via wireless communication, a communication link to a control unit of an access arrangement on a vehicle. A second identification routine allows the access arrangement to unambiguously identify the system. A third communication module receives update request data from the driver. An update routine updates authorization data in a memory of the system. When authorization is valid, the control unit receives a profiled control signal via the communication link, the profiled control signal causing the vehicle to be selectively opened via the control unit.

6 Claims, 2 Drawing Sheets

(51) Int. Cl.
*H04W 76/02* (2009.01)
*H04W 84/12* (2009.01)

(52) U.S. Cl.
CPC *H04W 76/023* (2013.01); *G07C 2009/00769* (2013.01); *G07C 2209/04* (2013.01); *H04W 84/12* (2013.01)

(58) Field of Classification Search
USPC .................................................. 340/426.36
See application file for complete search history.

(56) References Cited

U.S. PATENT DOCUMENTS

| | | |
|---|---|---|
| 2008/0066186 A1 | 3/2008 | Hammes |
| 2008/0150679 A1* | 6/2008 | Bloomfield ............. B60R 25/24 340/5.7 |
| 2009/0096596 A1* | 4/2009 | Sultan ................ G07C 9/00309 340/426.13 |
| 2009/0150306 A1 | 6/2009 | Campbell |
| 2010/0040234 A1* | 2/2010 | Alrabady ................ H04L 9/321 380/278 |

FOREIGN PATENT DOCUMENTS

| | | |
|---|---|---|
| EP | 1568834 A1 | 8/2005 |
| JP | 2005226439 A | 8/2005 |

* cited by examiner

SYSTEM ALLOWING A SERVICE PROVIDER TO SELECTIVELY OPEN A VEHICLE

CROSS-REFERENCE TO RELATED APPLICATIONS

This is a U.S. national stage of application No. PCT/EP2013/073835, filed on 14 Nov. 2013, which claims priority to the German Application No. DE 10 2012 223 304.0 filed 14 Dec. 2012, the content of both incorporated herein by reference.

BACKGROUND OF THE INVENTION

1. Field of the Invention

The present invention relates to a system for selectively opening a vehicle.

2. Related Art

Vehicles are by now frequently equipped with what are known as "keyless entry units" that allow the vehicle to be unlocked/locked externally by radio. This requires a control unit that is situated in the motor vehicle and that communicates by radio signals with an external unit that is usually integrated in a key or in an authorization card for the vehicle. The control unit situated in the vehicle and the external unit, also called an external identification unit, which the driver usually carries with him, make radio contact after both have been activated. Both units then use radio to interchange data that contain a stored code. If this code matches between the identification unit and the control unit, the vehicle is opened or closed by the authorized driver.

US 2009/0150306 A1 describes the arrangement of an appointment for services to be provided and the granting of entry to a security box with a key or code to the vehicle. The services described are a collect/bring service for goods, refilling/change of operating fluids for the vehicle, repairs/replacement of components of the vehicle, tire pressure checks, battery charging, cleaning (exterior/interior).

JP 2005-226439 A discloses entry authorization for service personnel for repairs by virtue of the transmission of a key code for the RKE (Remote Keyless Entry) system and parameters that limit entry, such as time, distance, number of times a mobile telephone of the service employee who is stored in the vehicle and sent to mobile telephone is entered.

When servicing work on the vehicle is pending, the driver needs to drop off his vehicle at a garage or service provider. For a certain period, his vehicle is no longer available to him, and the garage will possibly provide a replacement vehicle or the driver looks for alternative transport. Servicing is also known to include simple care and maintenance work, such as refueling, charging, cleaning, tire changes, refilling of other resources, such as oil, cooling water, Adblue, etc., technical inspection testing, exhaust testing. This work requires the presence of the driver to drop off and collect the vehicle—which cannot always be arranged in the diary.

SUMMARY OF THE INVENTION

It is an object of the invention to allow service personnel special access at the location of the vehicle in order to perform services without the involvement, but with the approval, of the vehicle keeper.

In a first refinement of the inventive system, a system is provided that comprises a first communication module for setting up a communication link to a communication terminal of a service provider of the authorization data via a communication network, a first identification routine for explicit identification of a service provider, a second communication module for setting up a communication link via a wireless communication network to a communication device of a controller of the entry arrangement of the vehicle, a second identification routine for explicit identification of the system by the entry arrangement, a third communication module for receiving an update request information item from the driver, and an update routine for updating authorization data in a memory of the system, wherein the second communication module for setting up a communication link via a wireless communication network to a communication device of the controller of the entry arrangement of a vehicle is used by the controller, when valid authorization data are available, to receive, by the communication link, a profiled control signal that prompts selective opening of the vehicle via the controller (120).

In a further refinement of the inventive system, the selective opening prompts the opening of the hood of the vehicle.

A further advantageous refinement of the system is distinguished in that the selective opening prompts the opening of the vehicle doors of the vehicle.

In one advantageous refinement of the inventive system, the selective opening prompts the opening of the fuel flap of the vehicle.

A further refinement of the system is distinguished in that a way to set up a communication link via the wireless communication network is provided via a mobile radio communication network and/or WLAN network.

A further refinement of the system is characterized in that encrypting the communication between the communication device of the system and the communication device of the entry arrangement is provided by virtue of the use of a shared secret.

The invention advantageously provides a reliable and safe way for the service provider to gain entry to the vehicle but for theft prevention not to be critically endangered.

The invention proposes the use of an alternating code method that can be used only by the service provider during a time window and expires after the single use. The vehicle needs to be provided with the alternating code by the driver, the alternating code originating in checked form from the service department, for example by being keyed in or by virtue of transmission from the mobile phone over a secured channel.

Advantageously, the vehicle can be left in public, shopping or company car parks. The service provider is provided with the entry code by the driver and can perform his servicing, cleaning or other services. By way of example, the vehicle is cleaned, both inside and outside, while shopping. The garage can repair the vehicle in situ or fit winter tires, these being stored in the garage, valet tanking. This allows successful implementation of battery checks or changes when a vehicle has been stationary for a relatively long time after a holiday or in the case of fleets. Recall actions by the OEMs, such as SW updates, can be performed more easily on the basis of the inventive system.

According to the invention, the vehicle or driver or a parking block management system can provide notification of when and where the vehicle is parked in order to be able to perform the service in situ. Locking apparatuses can be opened using the special individually negotiated alternating code.

The intention according to the invention is for a diary function in the vehicle, which diary function is integrated in a driver assistance system, to be used to arrange servicing appointments that are based on sensor systems in the vehicle, diagnosis on the vehicle, weather conditions or recall or servicing action authorized by the OEM in order to autonomously make contact with the garage or a service provider for this purpose, with possible intervention by the driver being rendered possible.

The intention according to the invention is additionally for the driver or one of the passengers to be made aware of the service that has been performed by a signal when they get into or leave the vehicle. The indication is provided by signaling via a driver assistance system, for example, which can output a warning to the driver or passengers. This signal contains the notification that a particular service has been performed on the vehicle.

Driver assistance systems are electronic supplementary devices in vehicles for assisting the driver in particular driving situations. Often, safety aspects, but especially increasing the driving comfort, are of primary importance in this context. These systems semiautonomously or autonomously influence drive, control (e.g., acceleration, braking) or signaling devices of the vehicle or use suitable man/machine interfaces to warn the driver shortly before or during critical situations. Examples of such driver assistance systems are parking aid (sensor arrays for obstacle and distance recognition), brake assist system (BAS), cruise control, adaptive cruise control (ACC), distance control, turning assistant, queue assistant, lane recognition system, lane keeping assistant/lane assistant (lane departure warning (LDW)), lane keeping support, lane change assistance, lane change support, intelligent speed adaptation (ISA), adaptive bend light, tire pressure control system, driver state recognition, traffic sign recognition, platooning, automatic emergency braking (ANB), full/dipped beam assistance for headlights and night vision system.

A preferred embodiment of the system for selectively opening a vehicle is distinguished in that this system has a first communication module for setting up a communication link to a communication terminal of a service provider of the authorization data via a communication network, of a first identification routine for explicit identification of the service provider, a second communication module for setting up a communication link via a wireless communication network to a communication device of a controller of the entry arrangement of a vehicle, a second identification routine for explicit identification of the system by the entry arrangement, a third communication module for receiving an update request information item from the driver and an update routine for updating authorization data in a memory.

In one advantageous refinement of the system, the wireless communication network is a mobile radio communication network. In a further particularly advantageous refinement of the system, the user is identified by voice recognition, by virtue of the transmission of an identification information item—PIN/TAN—or by a challenge-response method.

A further advantageous refinement of the inventive system is distinguished in that following execution of the update routine for the purpose of updating authorization data the system uses a wireless communication network to transmit a piece of information about the service that has been provided and the type of service to the communication device of the controller of the entry arrangement of the vehicle, wherein the controller of the entry arrangement of the vehicle uses a bus system in the vehicle to produce for a driver assistance system a message about the service that has been provided and the driver assistance system uses a man/machine interface to display a warning message about the service.

A further advantageous refinement of the inventive system is distinguished in that the bus system in the vehicle is a CAN bus.

A further advantageous refinement of the inventive system is distinguished in that the bus system in the vehicle is an Ethernet.

A further refinement is characterized in that means for identifying the service provider by virtue of the use of an explicit cryptographic information item are provided.

A particularly advantageous embodiment of the system has means for setting up a communication link via the wireless communication network via a mobile radio communication network and/or WLAN network, which can also be embodied as a vehicle-to-vehicle or a vehicle-to-infrastructure communication.

In a further, very secure embodiment, encrypting the communication between the communication device of the system and the communication device of the entry arrangement is provided by the use of a shared secret.

In a further refinement of the inventive system, registration of the vehicle is performed as a first step. Next, the position of the vehicle is ascertained, and then a position of the parked vehicle is released as a service address to the system using a communication device via a communication network. The position of the parked vehicle or of the stationed vehicle is transmitted using a communication unit via a communication network. In addition, the authorization clearance for the opening at least one door and/or a trunk of the vehicle by a service employee is transmitted using a communication device of the system to a communication terminal of the service employee, with opening being valid within a particular time window. This time window is determined in automated fashion using the service that is to be performed.

When authorization is available for the entry arrangement, opening of at least one door and/or a trunk and/or the hood and/or the gas cap of the vehicle is activated, and opening and performance of the service is followed by the service provider manually closing a door and/or the trunk and/or gas cap and/or the hood of the vehicle to confirm transmission of the performed service by the service provider to the communication terminal of the driver via the inventive system using the communication device via the communication network. Following transmission of an update request by the communication device of the driver, authorization data are updated in the controller of the entry arrangement.

In a further advantageous refinement, notification of the service having been performed can be provided by virtue of the vehicle using the communication device to transmit, as a data package, an SMS, email or other electronic notification to the driver via the communication network to the communication terminal about the successful provision of the service within the prescribed time window. When the driver opens the vehicle, the entry arrangement provides him with a brief notification, which is presented audibly or visually on the screen of the communication terminal, of a service such as an oil change having been provided. By outputting that a service has been provided, the intention of the invention is for a warning to be output when getting out of the vehicle if, by way of example, the driver ought to be mindful of further actions, such as the fact that the nuts on the rims should be tightened after approximately 50 km.

The intention of the invention is for visual, audible, sensory documentation of the service to be provided by an onboard camera. This type of documentation also serves simultaneously as an identification unit that can be used in accordance with the invention to identify the service provided. The intention in this regard is that when the vehicle is opened, cameras in the vehicle that are fitted in the vehicle for these or other purposes take photographs or film and are triggered by the entry arrangement. The intention is also that cameras are fitted in the trunk. A particular advantage is the use of cameras that are fitted for blind spot detection, parking assistance, support for adaptive restraint systems, sleep warning systems or other purposes and are actuated by the entry arrangement when the trunk, the gas cap, the hood or the doors are opened. The films or photographs can avoid or shed light on any instances of misuse. Sensor values from acceleration sensors or what are known as structure-borne sound sensors or microphone signals are likewise used for documentation purposes for the service provided.

In a further advantageous refinement, the position of at least one free stationing area is computed from the current position of the vehicle, and transmitted to a navigation apparatus of the vehicle, on the basis of vehicle-to-vehicle and/or vehicle-to-infrastructure communication. In this case, the navigation apparatus can transmit the position to the system via the communication devices.

A further refinement of the inventive system is distinguished in that the position of the free stationing area is transmitted to the navigation apparatus when the vehicle is situated in a previously defined region in relation to the free stationing area, preferably in proximity to a barrier of a parking facility.

A very advantageous refinement is characterized in that after the vehicle is stationed on a selected free stationing area the position of the selected stationing area is transmitted to a storage medium that the driver is preferably able to transport, preferably a key of the vehicle and/or a mobile telephone of the driver and/or a chip card, is then stored on a storage medium and is preferably additionally displayed.

One advantageous refinement is distinguished in that the navigation apparatus or the storage medium transmits the position of the selected stationing area to the system via a parking space management system of the parking facility.

In a further refinement, when the selected stationing area is left, the position of the stationing area that is now free again is transmitted to the system via the parking space management system of the parking facility.

In a further advantageous refinement, the position of the at least one free stationing area is computed from a distance measurement from at least one vehicle or at least one infrastructure element to other vehicles or to other infrastructure elements that are arranged within a circle of previously stipulated radius around the vehicle looking for a free stationing area.

One advantageous refinement is characterized in that the at least one infrastructure element transmits further information concerning the stationing area situation, preferably about resident parking zones or stopping restrictions, and/or provides said information from a digital map of the navigation apparatus and uses it to compute the position of the at least one free stationing area.

In a further refinement, the service provider is identified by voice recognition, by transmission of an identification information item—PIN/TAN—or by a challenge/response method.

A further refinement is characterized in that the system is identified by the use of an explicit cryptographic information item.

In a further particularly advantageous embodiment, the communication link via the wireless communication network is set up via a mobile radio communication network and/or WLAN network.

In a further advantageous refinement, the communication between the communication device of the system and the communication device of the entry arrangement and the communication device of the service provider is encrypted by virtue of the use of a shared secret.

An advantage of the inventive system is that by this management of whereabouts of the vehicles, to be located logistic synergistic effects are produced, since a high level of vehicle automation is provided for providing services to the relevant vehicles.

A further aspect of the invention is that a communication link is set up between an authorized service provider, who receives the relevant authorization data from the inventive system, and the entry apparatus of the vehicle. When the system or the mobile terminal of the service provider has been successfully identified, the authorization data in the controller of the entry arrangement are updated and accordingly activated for the conveyance operation of the service provider, so that the service in the trunk or in the passenger compartment, for example, is approved for the service provider by virtue of the authorized approval of opening of the vehicle doors or tailgate of the trunk by the controller. Normally, it is at the rear, some vehicle types having it at the front. In automotive engineering, the passenger compartment denotes the space that contains the vehicle occupants.

In addition, following initiation by the driver on the system, the system can take place in fully automated fashion, that is to say quickly and without cost-incurring employment of personnel. The use of an existing mobile radio infrastructure and the opportunity to implement that largely using commercially available server components also reduce costs. Furthermore, the automation minimizes the risk of incorrect inputs. A further advantage of the invention is the opportunity for the updating of the authorization data to be able to take place directly via a mobile terminal of the driver and of the service provider.

The inventive vehicle provides a reliable and safe way for a service provider to be able to open the trunk, for example, but for this not to critically endanger theft prevention. It is possible to use an alternating code method, which can be used once, just in a time window, by the service provider only and expires after being used once.

The vehicle or the driver log on via communication links in an infrastructure unit, such as a parking block management system, connected to the inventive system, this logon involving the inventive system being notified of when and where the vehicle is parked in order to be able to receive a consignment via a service provider. In this context, the infrastructure and the resultant information service advantageously ensure that the deliveries can be conveyed by the delivery service in optimized fashion as a result of optimized grouping of consignments.

The intention of the transmission of the authorization to open the relevant vehicle is also that transmission of the authorization from the mobile terminal of the service provider or the delivery vehicle networked thereto involves all vehicles in the vicinity that are expecting a delivery reacting to the radio signal produced by the service provider with a light signal. This facilitates location by the service provider in order to find the relevant vehicles quickly, and, as already mentioned, it is possible for the trunk or the doors to be opened only using the special individual alternating code.

BRIEF DESCRIPTION OF THE DRAWINGS

The inventive system is explained in more detail below in relation to the drawings, in which.

DETAILED DESCRIPTION OF THE PRESENTLY PREFERRED EMBODIMENTS

Figure 1:
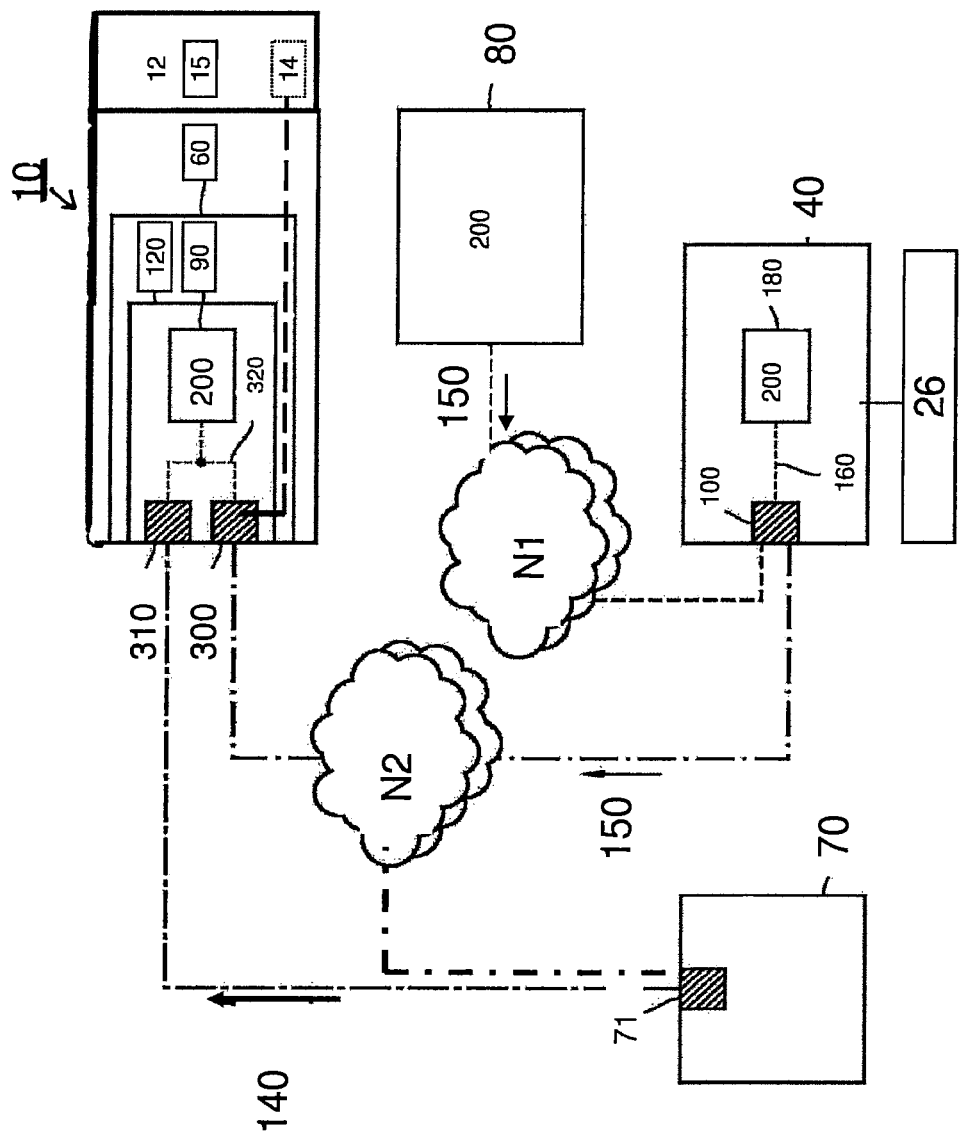
FIG. 1 shows a vehicle with a communication apparatus and a schematic illustration of an arrangement for implementing the inventive method and system.

As shown in FIG. 1, a vehicle 10, for example an automobile or truck, that is intended to be parked on a stationing area is equipped with a positioning system, for example a GPS system 12, that contains a computation apparatus 14 and a navigation apparatus 15. In this regard, authorization data 200 for an entry arrangement 60 of a vehicle 10 and a communication terminal 71 of the service provider 70 are updated. The system 40 may be a server-based solution that has the usual components and peripherals such as processor, memory, network access, operating system, application software, etc. In addition, a first communication network N1 and a second communication network N2 are provided.

By way of example, the communication terminal 71 of the service provider 70 is a mobile radio terminal, a multifunctional smartphone, a chip card or a similar terminal with radio communication capability having a memory that has at least one communication device. The system 40 has a communication device 100 that the system 40 can use to communicate both with the communication network N1 and with the communication network N2. In addition, in the system 40 the communication device 100 is connected via a data bus 160 to a data module 180 using relevant communication protocols. This data module or another competent device has allocated or managed the authorization data originally. The authorization data 200 also comprise the profiled authorization data. The communication terminal 80 of the driver is likewise connected to the communication network N1, for example wirelessly.

The vehicle has an entry arrangement 60. This entry arrangement 60 has a controller 120. This controller 120 is connected to the communication network N2 via a communication device 300. Likewise in the controller 120, a memory 90 stores the authorization data 200 of authorized service providers for the entry arrangement 60.

The mobile terminal or communication terminal of the service provider 70, which has a communication device 71, is additionally shown. By this mobile terminal, it is possible to use its communication device 71 to transmit a coded and encrypted radio signal 140 to a communication device 310 of the controller 120 of the entry arrangement 60.

A radio signal is understood to mean a communication signal, this being based on electromagnetic signals, including optical signals (e.g. infrared light). The vehicle 10 reacts to a particular encrypted radio signal 140 from the communication terminal 71 of the service provider 70, which radio signal 140 is preferably limited to a particular time window and is canceled following use of the opening command. The radio signal 140 provides entry authorization, but not driving authorization to start the vehicle. According to the invention, an active alarm system—not shown—is modified for the period of the authorized length of the service to the vehicle such that an alarm is not triggered.

The radio signal can be used to initiate various functions of the entry arrangement 60. This may be the opening or closing of the door locking system or the trunk locking system or the hood or the gas cap, for example. In this case, the communication terminal 71 of the service provider 70 is assigned particular information and the controller is assigned user data, for example determined by the data module of the system, and the information and user data are stored. The user data allow the entry arrangement 60 of a particular vehicle to be operated only using a particular communication terminal 71 of the service provider 70. The memory 90 and the communication devices 300/310 of the vehicle 10 and are connected to one another via a data bus 320 by using relevant communication protocols.

The radio signal 140 is used to transmit data packets that, as a first data element, are able to comprise a vehicle identification, a vehicle color, vehicle type, vehicle license plate, a digital identification code, a telephone number, as a second data element, are able to comprise the vehicle position or a URL for a service, such as an IP-based parking space management system 26, where the vehicle position can be queried, and as a third data element, an entry code that allows a profiled entry for the service provider and provides driving authorization and that becomes invalid after a particular time. Alternatively, further data fields are used, such as "search code", "door, hood, trunk, gas cap opening approval". Furthermore, the data packet contains elements that allow the property of the service that has been provided to be inferred.

The communication terminal 80 of the driver, which is likewise a mobile phone, smartphone, a multifunctional vehicle key or a chip card, contains, or receives from the vehicle 10 via the system 40, a particular number of entry codes 200.

In this variant of the allocation of the authorization, the vehicle does not necessarily need to be directly networked to the environment. The entry codes prepared in the communication terminal of the driver become valid when the driver gets out, which involves determination of the period of the time at which he gets out+X hours, X hours being the period of the stay in the parking space for the duration of the service.

Following explicit identification of the authorized service provider, the authorization data are produced by the communication device of the system via the communication network a communication link to the communication device of the controller of the entry arrangement.

The communication terminal 71 of the service provider 70 is then explicitly identified by the controller 120 of the entry arrangement 60. This can be done by using an explicit cryptographic key, for example. In this case, it is not necessary for this step to take place at a time immediately after the identification of the service provider and the stipulation of the update request.

One opportunity for the identification or authentication of the communication terminal of the service provider by the controller 120 of the entry arrangement 60 is a challenge/response method, for example. A prerequisite of this is that the controller 120 of the entry arrangement 60 and the communication terminal 71 of the service provider 70 have a shared cryptographic secret. This secret is expediently produced, either by the controller 120 of the entry arrangement 60 or by the system, when the driver first logs on/registers in the system 40. The secret is then stored in the memory 90 in the controller 120 and also in a memory 90' in the system 40. Following the start of communication between the communication terminal 71 of the service provider 70 and the controller 120 via the communication network N2, the controller 120 will send a challenge to the system 40 and the communication terminal 71 of the service provider 70, from which challenge the system 40 and the communication terminal 71 of the service provider 70 compute the response using the cryptographic secret and send the response back to the controller 120 of the entry arrangement 60 via the communication network N2. This method furthermore has the advantage that the subsequent further communication between the system 40, the communication terminal 71 of the service provider 70 and the controller 120 via the communication network N2 for the purpose of transmitting the update request can also take place in encrypted form using the shared secret and therefore there is no prerequisite for the protocols taking place via the communication network to provide adequate data integrity per se.

The relatively simple method for identification or authentication of the system by the controller 120 of the entry arrangement 60 is the use of a PIN code possibly together with a one-time TAN code. These codes, that is to say PIN and possibly a sufficient quantity of TAN codes, are expediently produced, either by the controller 120 of the entry arrangement 60 or by the system 40, and stored in the memory 90 of the controller 120 and also in the system 40 when the driver first logs on/registers in the system. In this case, the communication takes place in unencrypted form, and there is a prerequisite for the protocols taking place via the communication network to provide adequate data integrity.

Alternatively, the radio signal 140 can be split between the communication terminal 80 of the driver and the communication terminal 71 of the service provider 70 such that the transmitted data packets between the driver and a service provider in the entry arrangement 60, so that the data packet is transmitted to some extent by the driver mobile phone or e-mail or comparable technology, is stored with the service provider to some extent and the two packet elements yield an entry code or authorization data only together. This method advantageously prevents an entry code from being monitored during transmission and the vehicle from being opened without authorization.

In a variant of this method, the system 40 itself does not store any identification data. Rather, the system 40 transmits the identification data from the service provider 70 to the controller 120 after the communication between the system 40 and the controller 120 has been set up.

In this case, the identification data (e.g., PIN code or TAN codes) are firstly stored in the memory 90 of the controller 120. Secondly, they are known to the service provider 70 or stored in a memory in its communication terminal 71, for example.

Following explicit identification of the system 40 to the controller 120, the update request from the driver is transmitted from the communication device 100 of the system 40 to the communication device 300 of the controller 120 via the communication network N2. The authorization data 200 in the memory 90 of the controller 120 of the entry arrangement 60 are then updated in accordance with the update request.

A further example explains how the position finding for indication as a delivery location can take place in the downtown area of cities.

A large number of vehicles that have an identical setup and have the functionality described previously are parked at the edge of the road.

To implement the system according to the invention, it is advantageous that the vehicles have distance sensors that are mounted at the front, at the rear or at the side of the vehicles involved, such as ultrasonic, infrared, radar sensors, a camera, etc. In addition, the vehicles can use the computation unit 14 to perform vehicle-to-vehicle communication and/or vehicle-to-infrastructure communication using the communication devices. In addition, a navigation apparatus 15 is in place.

While looking for a parking space, the driver of the looking vehicle first of all uses a key or a command to establish a connection to vehicles in a circle of a predefined radius around the vehicle. This "awakes" the already parked vehicles in the circle from what is known as a sleep mode (inactive state) and puts them into the active state. The vehicles that are now in the active state then measure their distances from the next vehicle or from the next infrastructure device, for example a set of traffic lights or a road sign, at the front, rear and/or at the sides.

Vehicle-to-vehicle communication is used to transmit the ascertained distance data from the vehicles in the circle to the computation unit 14 of the vehicle 10 looking for a stationing area. In addition, the positions of the respective vehicles are transmitted to the computation unit 14 of this vehicle 10. The computation apparatus of the GPS system 12 can then use the information transmitted by C2C communication to establish the respective available area for parking. If the area is large enough, the corresponding free space is identified as a stationing area and is indicated to the driver as a stationing area available for parking. After the vehicle 10 has occupied the parking space, the communication device is used to transmit this position from the GPS system to the system.

The navigation apparatus 15 can take the data ascertained by the computation unit and compute the route from the current position of the vehicle looking for a stationing area to the free stationing area and can make the route available to the driver so that he can quickly find the parking space. If there are a plurality of free stationing areas in the vicinity of the vehicle, they can be presented on a display of the computation unit, so that the driver can select a stationing area that is suitable for him.

According to the invention, it is possible for the authorized service provider 70 to update the authorization data 200 of the entry arrangement 60 even without using a service control center. To this end, the mobile radio terminal 70 of the authorized service provider 70 first of all sets up a connection via the radio communication network to the communication device 310 of the entry arrangement 60. The authorized service provider 70 is then explicitly identified. This can be done in various ways. According to the invention, the controller 120 can produce an authorization code and use the communication device 310 to send it to the mobile radio terminal of the authorized service provider 70, for example as a short message—SMS. This authorization code is stored in the mobile radio terminal in a memory or on the SIM card thereof. If the user data need to be updated, this authorization code needs to be returned to the communication device. According to the invention two-part identification can then take place. This first of all involves a check to determine whether the authorization code has been sent by a known mobile radio terminal or the SIM card thereof. If this is the case, the authorization code sent by the mobile radio is then checked by the controller 120 of the entry arrangement 60 in a second step. If the result of this check is positive, the authorization data 200 are updated, e.g., erased, in the controller 120 in accordance with the request.

This method for identifying the service provider 70 can also be provided with even further security by virtue of the communication device 300 of the controller 120, having received the authorization code, sending a challenge, for example as a short message—SMS—, to an address (telephone number) that has previously been stored for a mobile radio in the controller or in the communication device of the controller 120, the address then needing to be confirmed within a time window, e.g., again by a short message with an authorization code to the communication device 300 of the controller 120. At this point, the information concerning what type of service providers are involved is also transmitted. The identification also allows the type of service to be indicated.

A further possible identification method is the use of a challenge/response method, described in detail above, wherein a shared secret is exchanged in advance between the controller of the entry arrangement and the mobile radio terminal 71 of the service provider 70, or the SIM card thereof. In this context, the mobile radio terminal of the service provider needs to authenticate itself to the entry arrangement.

The methods described above can be used advantageously not only for erasing user data in the memory but also for reactivating user data.

According to the invention, the system described can also be customized for RKE—remote keyless entry—keys or else engine immobilizers.

Figure 2:
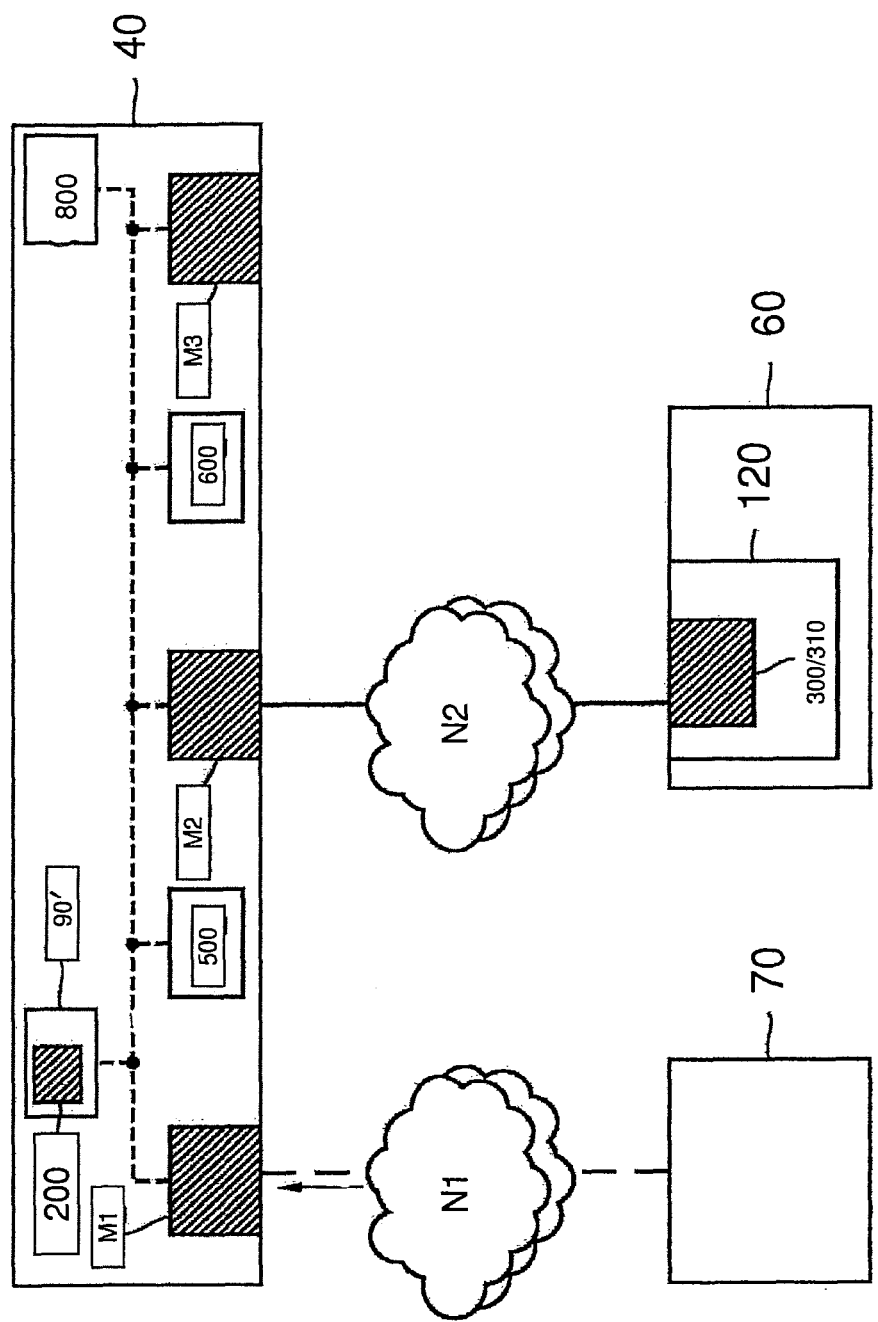
FIG. 2 shows a schematic illustration of an arrangement for implementing the inventive system.

FIG. 2 schematically shows a preferred embodiment of the system for the selective opening of a vehicle. The system has a first communications module M1 configured to establish a communication link to a communication terminal unit of a service provider 70 of the authorization data 200 via a communications network N1. A first identification routine 500 provides for the unambiguous identification of the service provider 70. A second communications module M2 is configured to establish a communication link via a wireless communications network N2 to a communication device 300/310 of a control device 120 for the access arrangement 60 of a vehicle 10. A second identification routine 600 provides for the unambiguous identification of the system 40 by the access arrangement 60. A third communications module M3 receives update request information from the driver. An updating routine 800 updates authorization data 200 in a memory 90'.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for selectively opening a vehicle, comprising:
a first communication module configured to set up a communication link to a communication terminal of a service provider of authorization data via a communication network;
a first identification module configured to execute a first identification routine that explicitly identifies a service provider;
a second communication module configured to set up a communication link via a wireless communication network to a communication device of a controller of an entry arrangement of the vehicle;
a second identification module configured to execute a second identification routine that explicitly identifies the system by the entry arrangement;
a third communication module configured to receive an update request information item from a driver; and
an update module configured to execute an update routine that updates authorization data in a memory of the system,
wherein the second communication module is used by the controller, when valid authorization data are available, to receive, by the communication link, a profiled control signal that prompts selective opening of the vehicle via the controller,
wherein the selective opening is valid within a particular time window, the time window being determined automatically on the basis of a service to be performed on the vehicle during the selective opening of the vehicle, and
wherein upon an opening of the vehicle by the driver of the vehicle subsequent to completion of the service performed on the vehicle during the selective opening, the entry arrangement provides the driver with an audible or visual notification of the service that has been provided to the vehicle.

2. The system as claimed in claim 1, wherein the selective opening prompts the opening of a hood of the vehicle.

3. The system as claimed in claim 1, wherein the selective opening prompts the opening of vehicle doors of the vehicle.

4. The system as claimed in claim 1, wherein the selective opening prompts the opening of a fuel flap of the vehicle.

5. The system as claimed in claim 1, wherein the communication link via the wireless communication network is provided via a mobile radio communication network and/or WLAN network.

6. The system as claimed in claim 1, wherein the communication between the system and the entry arrangement is encrypted using a shared secret.

* * * * *